US008600730B2

(12) United States Patent
Aue

(10) Patent No.: US 8,600,730 B2
(45) Date of Patent: Dec. 3, 2013

(54) LANGUAGE SEGMENTATION OF MULTILINGUAL TEXTS

(75) Inventor: Anthony Aue, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 13/022,630

(22) Filed: Feb. 8, 2011

(65) Prior Publication Data

US 2012/0203540 A1    Aug. 9, 2012

(51) Int. Cl.
*G06F 17/28*    (2006.01)
(52) U.S. Cl.
USPC .................................. 704/2; 704/8; 704/277
(58) Field of Classification Search
USPC .............. 704/1, 2, 3, 4, 8, 242, 243, 256, 277
See application file for complete search history.

(56) References Cited

U.S. PATENT DOCUMENTS

| | | | |
|---|---|---|---|
| 5,477,451 A * | 12/1995 | Brown et al. | 704/9 |
| 5,913,185 A * | 6/1999 | Martino et al. | 704/8 |
| 6,047,251 A * | 4/2000 | Pon et al. | 704/1 |
| 6,542,888 B2 * | 4/2003 | Marques | 704/9 |
| 6,832,191 B1 * | 12/2004 | Frasca et al. | 704/257 |
| 7,035,801 B2 * | 4/2006 | Jimenez-Feltstrom | 704/255 |
| 7,054,803 B2 * | 5/2006 | Eisele | 704/2 |
| 7,593,843 B2 * | 9/2009 | Aue et al. | 704/2 |
| 7,680,646 B2 * | 3/2010 | Lux-Pogodalla et al. | 704/2 |
| 7,974,843 B2 * | 7/2011 | Schneider | 704/254 |
| 8,060,360 B2 * | 11/2011 | He | 704/9 |
| 8,265,923 B2 * | 9/2012 | Chatterjee et al. | 704/2 |
| 8,271,869 B2 * | 9/2012 | Aue | 715/234 |
| 8,326,602 B2 * | 12/2012 | Sites | 704/8 |
| 8,468,011 B1 * | 6/2013 | Sites | 704/8 |
| 2001/0013047 A1 | 8/2001 | Marques | |
| 2002/0095288 A1 * | 7/2002 | Sparre et al. | 704/256 |
| 2004/0006467 A1 * | 1/2004 | Anisimovich et al. | 704/251 |
| 2005/0033567 A1 * | 2/2005 | Sukehiro | 704/8 |
| 2005/0033575 A1 * | 2/2005 | Schneider | 704/254 |
| 2008/0262826 A1 | 10/2008 | Pacull | |
| 2008/0300857 A1 * | 12/2008 | Barbaiani et al. | 704/4 |
| 2009/0055162 A1 | 2/2009 | Qian et al. | |
| 2009/0112573 A1 * | 4/2009 | He | 704/4 |
| 2009/0299729 A1 * | 12/2009 | Quirk et al. | 704/9 |
| 2010/0125447 A1 * | 5/2010 | Goswami | 704/8 |

(Continued)

OTHER PUBLICATIONS

Sherman, et al., "Using Hidden Markov Models for Topic Segmentation of Meeting Transcripts—Published Date: 2008", Retrieved at << http://www.hlt.utdallas.edu/~yangl/papers/SLT08_topic.pdf >>, Spoken Language Technology Workshop, IEEE, Dec. 15-19, 2008, pp. 4.

(Continued)

*Primary Examiner* — Martin Lerner
(74) *Attorney, Agent, or Firm* — International IP Law Group, PLLC

(57) ABSTRACT

A system and method for segmenting a multi-language text is provided. An exemplary method comprises determining an initial probability distribution for sentences in the multi-language text, the initial probability distribution indicating the likelihood of each sentence being in each of a set of languages. A probability of language transitions across sentences may be learned based on the initial probability distribution. Additionally, a highest probability language sequence of sentences in the multi-language text may be determined based on a combination of the probability of language transitions and the prior probability distribution provided by an initial model.

20 Claims, 4 Drawing Sheets

(56) References Cited

U.S. PATENT DOCUMENTS

| | | | |
|---|---|---|---|
| 2010/0204981 A1 | 8/2010 | Ribeiro et al. | |
| 2010/0278428 A1* | 11/2010 | Terao et al. | 382/177 |
| 2010/0312545 A1* | 12/2010 | Sites | 704/8 |
| 2011/0282643 A1* | 11/2011 | Chatterjee et al. | 704/2 |
| 2012/0095748 A1* | 4/2012 | Li et al. | 704/8 |
| 2012/0197627 A1* | 8/2012 | Shi et al. | 704/2 |

OTHER PUBLICATIONS

Nguyen, et al., "Nonparametric Word Segmentation for Machine Translation", Retrieved at <<http://www.cs.cmu.edu/~nasmith/papers/nguyen+vogel+smith.coling10.pdf >>, Proceedings of the 23rd International Conference on Computational Linguistics, 2010, pp. 9.

Snyder, et al., "Unsupervised Multilingual Learning for Morphological Segmentation", Retrieved at << http://people.csail.mit.edu/bsnyder/papers/SnyderB-acl08.pdf>>, In The Annual Conference of the Association for Computational Linguistics, 2008, pp. 9.

Louloudis, et al., "Line and Word Segmentation of Handwritten Documents," Elsevier, Pattern Recognition, vol. 42, 2009, pp. 3169-3183, Journal homepage: www.elsevier.com/locate/pr (previously submitted in IDS Filed Feb. 8, 2011, revised with date).

* cited by examiner

100

300

LANGUAGE SEGMENTATION OF MULTILINGUAL TEXTS

BACKGROUND

Machine translation systems are used to translate text from one language to another. These systems may use statistical models for guidance in translation by parsing the text into segments and then applying statistical models to arrive at a resulting translation. Models are most often learned by obtaining bilingual text corpora where the translations are known. The translations appear in parallel throughout several pages. The machine translation system will learn linguistic rules based on the parallel pages of text and apply the rules to new text. As a result, the more data (i.e., bilingual text) the machine translation system has been provided, the better the machine translation system functions. Currently, a large amount of textual data is overlooked by machine translation systems because it appears on multilingual pages instead of parallel pages.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

The subject innovation relates to language segmentation of texts using hidden Markov models. An exemplary method determines an initial probability distribution for sentences in the multi-language text, the initial probability distribution indicating the likelihood of each sentence being in each of a set of languages. A probability of language transitions across sentences is learned based on the probability distribution. A highest probability language sequence of sentences in the multi-language text is determined based on a combination of the probability of language transitions and a prior probability distribution provided by an initial model.

An exemplary system relates to language segmentation of texts using hidden Markov models. One exemplary system comprises a processing unit and a system memory. The memory system, which comprises a computer-readable storage medium, stores code configured to direct the processing unit to determine an initial probability distribution for sentences in the multi-language text, the initial probability distribution indicating the likelihood of each sentence being in each of a set of languages. Also stored in the system memory is code to direct the processing unit to learn a probability of language transitions across sentences based on the probability distribution. Code stored in the system memory may also be configured to cause the processing unit to determine a highest probability language sequence of sentences in the multi-language text based on the probability of language transitions and the prior probability distribution provided by the initial model.

Another exemplary embodiment of the subject innovation provides one or more computer-readable storage media that includes code to direct the operation of a processing unit. The code may direct the processing unit to segment language using hidden Markov models. The computer-readable storage media may comprise code that could direct a processing unit to determine an initial probability distribution for sentences in the multi-language text, the initial probability distribution indicating the likelihood of each sentence being in each of a set of languages. Code stored on the computer-readable storage media may include code configured to learn a probability of language transitions across sentences based on the probability distribution. In addition, code stored on the computer-readable storage media may be configured to determine a highest probability language sequence of sentences in the multi-language text based on a combination of the probability of language transitions and the prior probability distribution provided by an initial model.

The following description and the annexed drawings set forth in detail certain illustrative aspects of the claimed subject matter. These aspects are indicative, however, of but a few of the various ways in which the principles of the innovation may be employed, and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
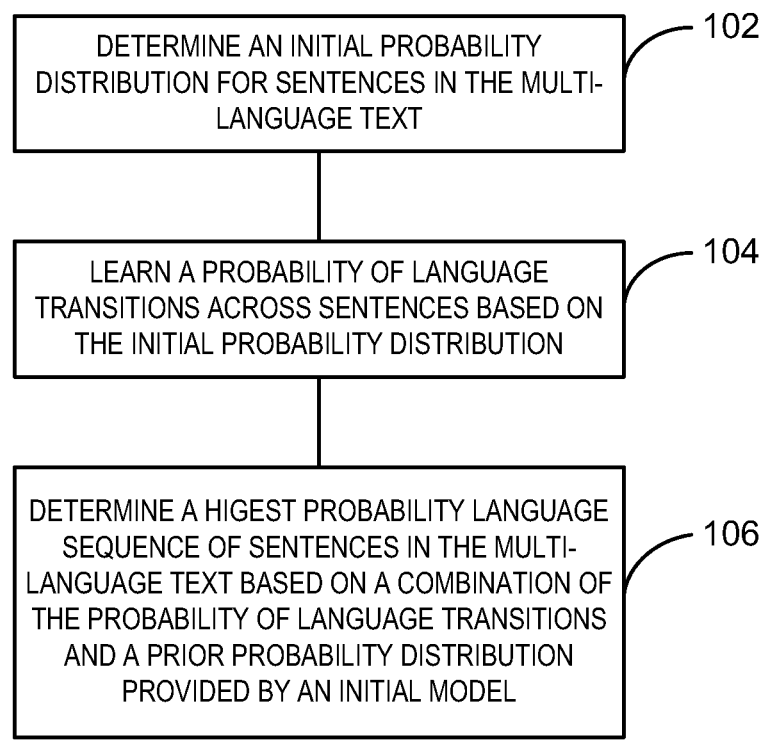
FIG. 1 is a process flow diagram of a method for language segmentation of texts using hidden Markov models according to the subject innovation.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," and the like are intended to refer to a computer-related entity, either hardware, software (e.g., in execution), and/or firmware. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media, such as a computer-readable storage media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for electrical or electronic signals and the like.

Those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The subject innovation relates to language segmentation of texts using hidden Markov models, allowing access to data sources containing bilingual text that machine translation systems currently do not access. For example, user manuals for many consumer products are readily available on the Internet and typically contain the same set of instructions in various languages. Additionally, the user manuals generally follow the same textual "pattern," having a large portion of text in one particular language followed by another large portion of text in another language. This may be referred to as a "manual pattern" of text. Likewise, there are several websites dedicated to learning another language. These websites usually have a sentence or word in one language, followed by the translation of the sentence or word. A "glossary pattern" of text may be defined as alternating utterances with a single word or sentence in one particular language followed by another word or sentence in another language. Many documents, including those consisting solely of the manual pattern and glossary pattern texts can be accurately modeled using first-order hidden Markov models, which are well known in the art.

FIG. 1 is a process flow diagram of a method for language segmentation of texts using hidden Markov models according to the subject innovation. At block 102, an initial probability distribution is determined for sentences in the multi-language text, the initial probability distribution indicating the likelihood of each sentence being in each of a set of languages. This initial probability distribution P(L|S) may be found using an automatic language detector on each sentence, where L represents a particular language and S represents a particular sentence. The automatic language detector may identify the top language choice for each sentence given the sentence itself. Alternatively, when the sentences of the text are not readily apparent, the automatic language detector may be applied to the entire text as a whole and used to identify a top language choice for the entire text. Based on the top language choice, an appropriate language-specific sentence breaker is then used to break the text into a number of sentences s. The automatic language detector may be applied to each of the sentences s, resulting in an initial probability distribution over a set of languages for each sentence.

At block 104, a probability of language transitions across sentences based on the initial probability distribution is learned. The sentences surrounding one particular sentence may contain information about the probability of the one particular sentence being in any given language. For example, in the middle of a large monolingual block of text, it is relatively unlikely to find one particular sentence in a different language. However, in the case of a French to English Glossary, where the language sequence typically looks like this:

F->E->F->E->F where "F" represents a sentence in French and "E" represents a sentence in English, there is a high probability that the next sentence in the sequence will be in English. Consequently, the probability of language transitions across sentences may be broken into two parts: first, the probability of the language given the sentence itself; second, the probability of a language given the language of surrounding sentences. This can be formally stated as:

P(L|S)*P(L|surrounding L's)

Where P(L|surrounding L's) represents the transition probabilities (or the probability of a language given the surrounding sentences). By conditioning the transition probabilities solely on the k previous sentences, the probabilities may be learned using a hidden Markov model of order k. In a hidden Markov model, the sequence of states that the model passes through is unknown, but a probabilistic function based on the model is known. The state transition probabilities of the hidden Markov model are trained by taking sentences s and their probability distribution as input and training the state transition probabilities using the forward-backward algorithm. For each sentence, the symbol for the most likely language given the initial probability and the transition probabilities is determined.

A first order hidden Markov model only looks at the preceding symbol in order to figure out probability of the current symbol. However, a second order hidden Markov model is able to look at two preceding symbols in order to determine the probability associated with the current symbol. A second order hidden Markov model is useful in recognizing the probability of language transitions across glossary text and manual text, allowing for more accurate segmentation of complex, multilingual patterns.

A hidden Markov model with states corresponding to each of the languages L identified by automatic language detection at block 102 results in an |L| by |L| matrix of transition probabilities. Since there is a 1:1 correspondence between states and output, there is no need to compute emission probabilities. For state 1, the probability of emitting language 1 is 1.0. P(L|S) is held constant and the transition probabilities P(L|surrounding L's) are computed using the forward-backward algorithm, which is well known in the art.

At block 106, a highest probability language sequence of sentences in the multi-language text is determined based on a combination of the probability of language transitions and a prior probability distribution provided by an initial model. Once the forward-backward algorithm has converged, the Viterbi algorithm may be used to compute the highest probability language sequence given a test input and hidden Markov model. The Viterbi algorithm computes the most likely sequence of states for a given sequence in an efficient manner by taking advantage of the "Markov assumption" for the model. The Markov assumption assumes that the model at time t depends on its state at times t−1 for a first order hidden Markov model. It also assumes that the model at time t depends on its state at times t−1 and t−2 for a second-order model. This assumption allows the Viterbi algorithm to collapse many state paths into a few state paths.

Employing a greedy approach to determine the highest probability language sequence would simply take the single best language label for each sentence as determined by the highest probability found, without use of the hidden Markov model. Such a naive approach is likely to be highly inaccurate, as the accuracy of automatic language detection components is highly dependent on their length. When sentences are short, the accuracy of automatic language detection is highly questionable. While likely inaccurate, the Greedy approach may be used as a baseline for comparison with the results of the hidden Markov model.

Figure 2:
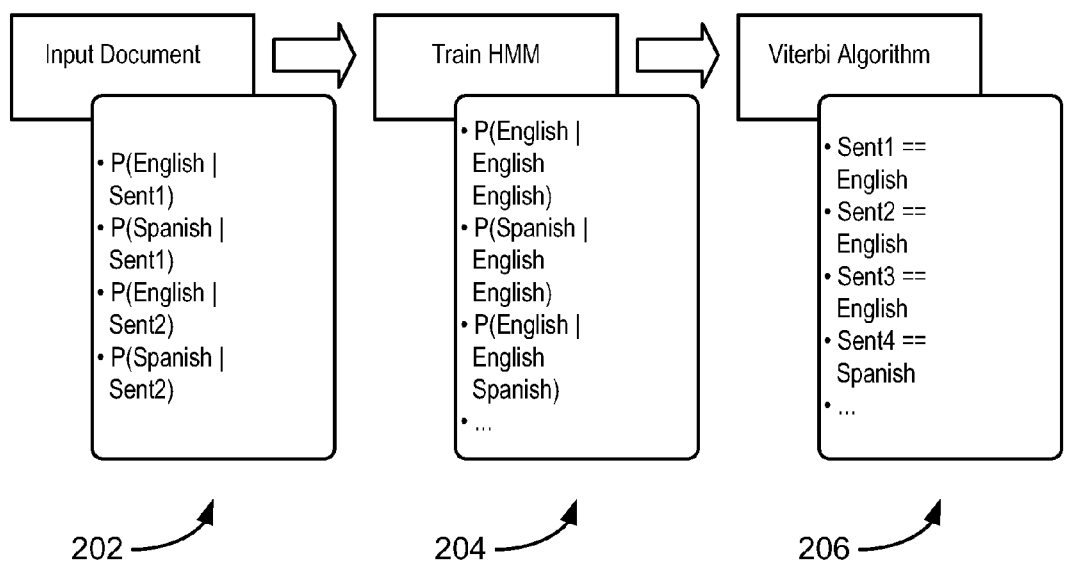
FIG. 2 is a block diagram that is useful in explaining language segmentation of texts using hidden Markov models according to the subject innovation.

FIG. 2 is a block diagram 200 that is useful in explaining language segmentation of texts using hidden Markov models according to the subject innovation. An input document is represented by a first panel 202. The input document has sentences that alternate between English and Spanish. A second panel 204 shows a process of training a hidden Markov model with the input document. After the training of the hidden Markov model, the Viterbi algorithm may be used to compute the highest probability language sequence for the given sentences, as shown by a third panel 206.

The subject innovation may be used in a variety of applications. It can be used to extract bilingual parallel data from multilingual documents for the purpose of training translation models for machine translation. The output for each language can also be used for training monolingual language models, which have a number of uses such as speech recognition and context-sensitive spelling.

Additionally, the subject innovation may be used to annotate documents with increased accuracy for information retrieval purposes, such as web searches. Current indexing methods for web searches describe each webpage as being in one particular language. However, the web page may contain multiple languages. Web pages containing multiple languages are generally not searched thoroughly. For instance, if a query is entered in Spanish, the query might not return a primarily English webpage even though the webpage has the searched term of the query in Spanish. This is due to the fact that the page would be labeled as an English page and thus would not be searched. Using the subject innovation, the query would return the webpage because each sentence is labeled with a particular language, not just the webpage.

Figure 3:
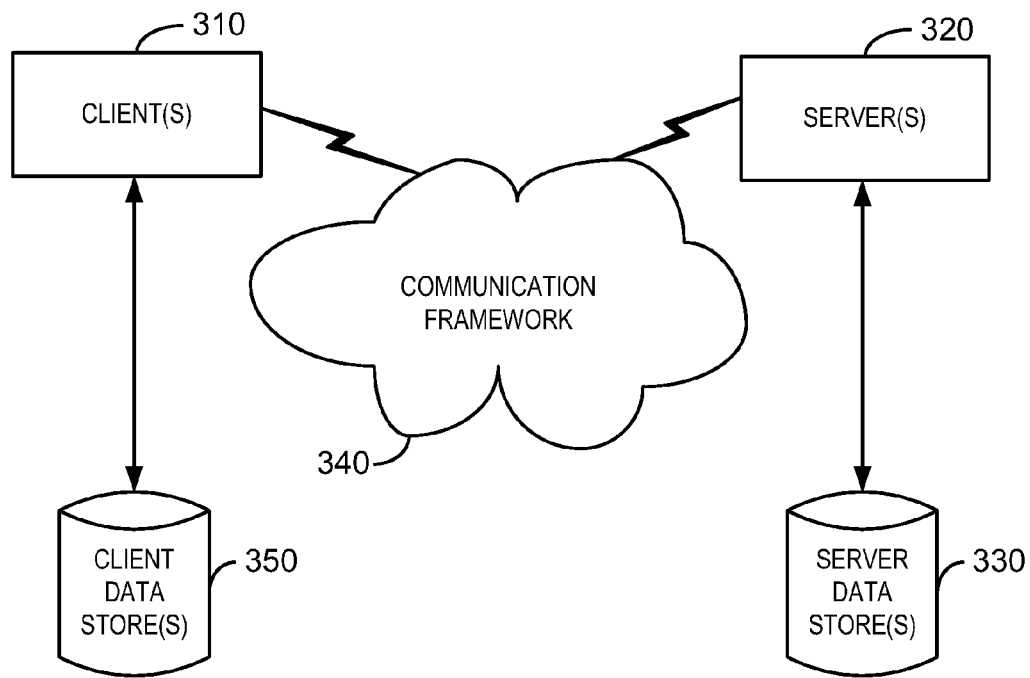
FIG. 3 is a block diagram of an exemplary networking environment wherein aspects of the claimed subject matter can be employed.
Figure 4:
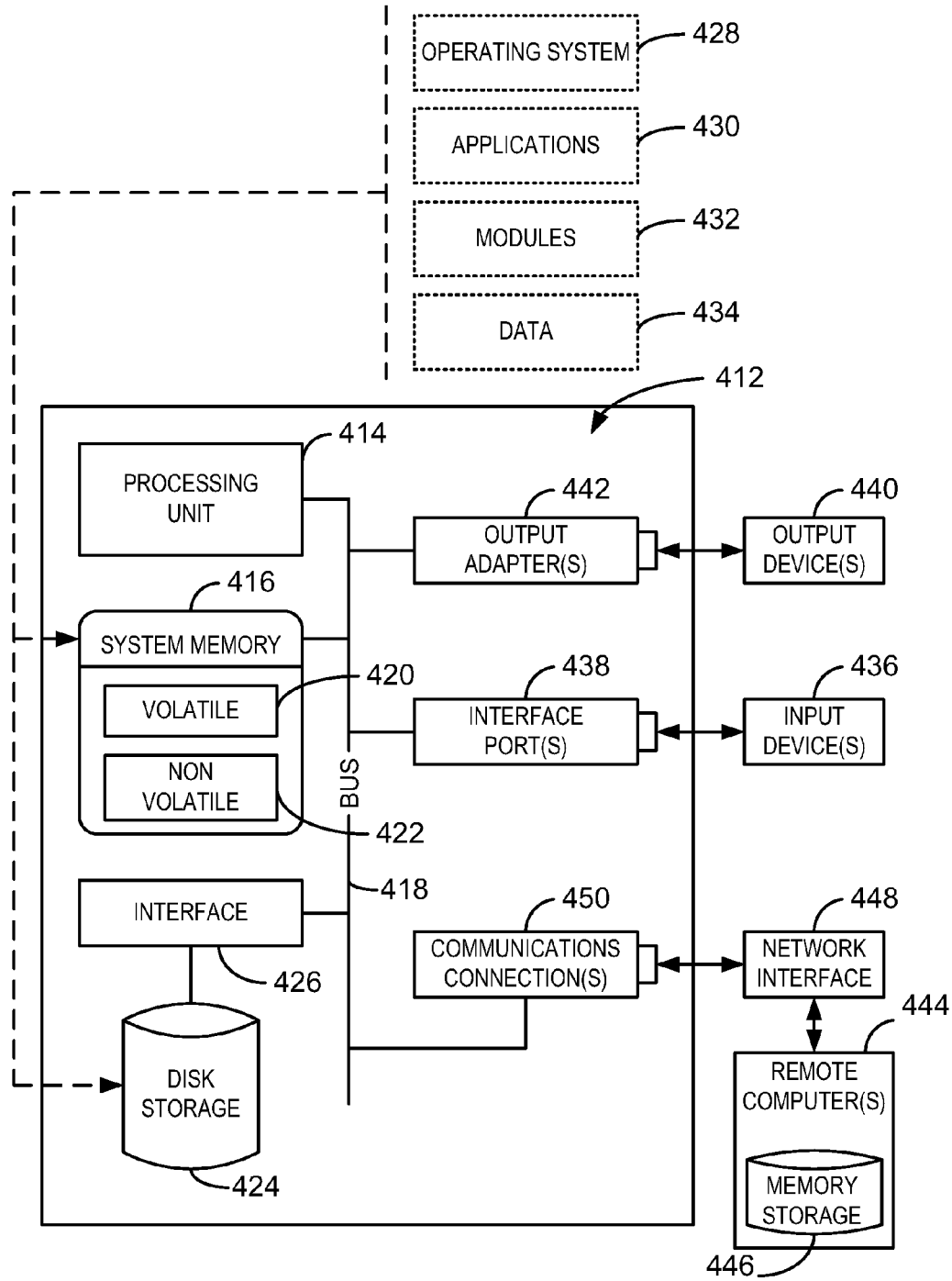
FIG. 4 is a block diagram of an exemplary operating environment that can be employed in accordance with the claimed subject matter.

In order to provide additional context for implementing various aspects of the claimed subject matter, FIGS. 3-4 and the following discussion are intended to provide a brief, general description of a suitable computing environment in which the various aspects of the subject innovation may be implemented. For example, language segmentation using hidden Markov models, as described in FIG. 1, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the subject innovation may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 3 is a schematic block diagram of a sample-computing system 300 with which language segmentation using hidden Markov models can be implemented. The system 300 includes one or more client(s) 310. The client(s) 310 can be hardware and/or software (e.g., threads, processes, computing devices). The system 300 also includes one or more server(s) 320. The server(s) 320 can be hardware and/or software (e.g., threads, processes, computing devices).

One possible communication between a client 310 and a server 320 can be in the form of a data packet adapted to be transmitted between two or more computer processes. This data packet may contain data to form a trigger or in response to a trigger. The system 300 includes a communication framework 340 that can be employed to facilitate communications between the client(s) 310 and the server(s) 320. The client(s) 310 are operably connected to one or more client data store(s) 350 that can be employed to store information local to the client(s) 310. Information in the data store(s) 350 may include multi-lingual text. The client data store(s) 350 do not have to be in the client(s) 310, but may be located remotely, such as in a cloud server. Similarly, the server(s) 320 are operably connected to one or more server data store(s) 330 that can be employed to store information local to the servers 320.

As an example, the client(s) 310 may be computers providing access to the Internet over a communication framework 340. The server(s) 320 may host websites accessed by the client, which may send segment text using hidden Markov models as explained herein.

With reference to FIG. 4, an exemplary environment 400 for implementing various aspects of the claimed subject matter includes a computer 412. The computer 412 includes a processing unit 414, a system memory 416, and a system bus 418. The system bus 418 couples system components including, but not limited to, the system memory 416 to the processing unit 414. The processing unit 414 can be any of various available processors. Dual microprocessors and other multiprocessor architectures also can be employed as the processing unit 414.

The system bus 418 can be any of several types of bus structure(s) including the memory bus or memory controller, a peripheral bus or external bus, and/or a local bus using any variety of available bus architectures known to those of ordinary skill in the art.

The system memory 416 may include non-transitory computer-readable storage media comprising volatile memory 420 and nonvolatile memory 422. The basic input/output system (BIOS), containing the basic routines to transfer information between elements within the computer 412, such as during start-up, is stored in nonvolatile memory 422. By way of illustration, and not limitation, nonvolatile memory 422 can include read only memory (ROM), programmable ROM (PROM), electrically programmable ROM (EPROM), electrically erasable programmable ROM (EEPROM), or flash memory.

Volatile memory 420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 412 also includes other non-transitory computer-readable media, such as removable/non-removable, volatile/non-volatile computer storage media. FIG. 4 shows, for example a disk storage 424. Disk storage 424 includes, but is not limited to, devices like a magnetic disk drive, floppy disk drive, tape drive, Jaz drive, Zip drive, LS-100 drive, flash memory card, or memory stick.

In addition, disk storage 424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 424 to the system bus 418, a removable or non-removable interface is typically used such as interface 426.

It is to be appreciated that FIG. 4 describes software that acts as an intermediary between users and the basic computer resources described in the suitable operating environment 400. Such software includes an operating system 428. Operating system 428, which can be stored on disk storage 424, acts to control and allocate resources of the computer system 412.

System applications 430 take advantage of the management of resources by operating system 428 through program modules 432 and program data 434 stored either in system memory 416 or on disk storage 424. It is to be appreciated that language segmentation using hidden Markov models can be implemented with various operating systems or combinations of operating systems. The browser that the user employs to access the Internet may be a program module 432.

A user enters commands or information into the computer 412 through input device(s) 436. Input devices 436 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 436 connect to the processing unit 414 through the system bus 418 via interface port(s) 438. Interface port(s) 438 include, for example, a serial port, a parallel port, a game port, and a universal serial bus (USB).

Output device(s) 440 use some of the same type of ports as input device(s) 436. Thus, for example, a USB port may be used to provide input to the computer 412, and to output information from computer 412 to an output device 440. Information rendered by the subject innovation may appear on an output device 440.

Output adapter 442 is provided to illustrate that there are some output devices 440 like monitors, speakers, and printers, among other output devices 440, which are accessible via adapters. The output adapters 442 include, by way of illustration and not limitation, video and sound cards that provide a means of connection between the output device 440 and the system bus 418. It can be noted that other devices and/or systems of devices provide both input and output capabilities such as remote computer(s) 444.

The computer 412 can be a server hosting a website in a networked environment using logical connections to one or more remote computers, such as remote computer(s) 444. The remote computer(s) 444 may be client systems configured with web browsers, PC applications, mobile phone applications, and the like, to allow users to browse the Internet, as discussed herein. The client web browser may be enhanced by segmenting language using hidden Markov models. The remote computer(s) 444 can be a personal computer, a server, a router, a network PC, a workstation, a microprocessor based appliance, a mobile phone, a peer device or other common network node and the like, and typically includes many or all of the elements described relative to the computer 412. For purposes of brevity, only a memory storage device 446 is illustrated with remote computer(s) 444. Remote computer(s) 444 is logically connected to the computer 412 through a network interface 448 and then physically connected via a communication connection 450.

Network interface 448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 450 refers to the hardware/software employed to connect the network interface 448 to the bus 418. While communication connection 450 is shown for illustrative clarity inside computer 412, it can also be external to the computer 412. The hardware/software for connection to the network interface 448 may include, for exemplary purposes only, internal and external technologies such as, mobile phone switches, modems including regular telephone grade modems, cable modems and DSL modems, ISDN adapters, and Ethernet cards.

An exemplary embodiment of the computer 412 may comprise a client computer with a web browser. An exemplary processing unit 414 for the client may be a computing cluster comprising Intel® Xeon CPUs. The disk storage 424 may comprise an enterprise data storage system, for example, holding thousands of user pages.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method of segmenting a multi-language text, comprising:
   determining, using a processing unit, an initial probability distribution for sentences in the multi-language text, the initial probability distribution indicating the likelihood of each sentence being in each of a set of languages;
   learning, using the processing unit, a probability of language transitions across sentences based on the initial probability distribution; and
   determining, using the processing unit, a highest probability language sequence of sentences in the multi-language text based on a combination of the probability of language transitions and a prior probability distribution provided by an initial model.

2. The method recited in claim 1, comprising using an automatic language detector to determine the sentences in the multi-language text.

3. The method recited in claim 1, wherein learning the probability of language transitions comprises using a hidden Markov model.

4. The method recited in claim 1, wherein learning the probability of language transitions comprises using a forward backward algorithm.

5. The method recited in claim 1, wherein determining a highest probability language sequence comprises using a Viterbi Algorithm.

6. The method recited in claim 1, comprising segmenting, using the processing unit, the multi-language text into a plurality of monolingual texts based on the highest probability language sequence.

7. The method recited in claim 1, wherein learning the probability of language transitions comprises using a second order Markov model.

8. A system for segmenting a multi-language text, the system comprising:
   a processing unit; and
   a system memory, wherein the system memory comprises code configured to direct the processing unit to:
      determine an initial probability distribution for sentences in the multi-language text, the initial probability distribution indicating the likelihood of each sentence being in each of a set of languages;
      learn a probability of language transitions across sentences based on the initial probability distribution; and
      determine a highest probability language sequence of sentences in the multi-language text based on a combination of the probability of language transitions and a prior probability distribution provided by a initial model.

9. The system recited in claim 8, comprising using an automatic language detector to determine the sentences in the multi-language text.

10. The system recited in claim 8, wherein learning the probability of language transitions comprises using a hidden Markov model.

11. The system recited in claim 8, wherein learning the probability of language transitions comprises using a forward backward algorithm.

12. The system recited in claim 8, wherein determining a highest probability language sequence comprises using a Viterbi Algorithm.

13. The system recited in claim 8, comprising segmenting the multi-language text into a plurality of monolingual texts based on the highest probability language sequence.

14. The system recited in claim 8, wherein learning the probability of language transitions comprises using a second order Markov model.

15. One or more computer-readable storage memory devices, comprising code configured to direct a processing unit to:
   determine an initial probability distribution for sentences in the multi-language text, the initial probability distribution indicating the likelihood of each sentence being in each of a set of languages;
   learn a probability of language transitions across sentences based on the initial probability distribution; and
   determine a highest probability language sequence of sentences in the multi-language text based on a combination of the probability of language transitions and a prior probability distribution provided by an initial model.

16. The one or more computer-readable storage memory devices recited in claim 15, comprising using an automatic language detector to determine the sentences in the multi-language text.

17. The one or more computer-readable storage memory devices recited in claim 15, wherein learning the probability of language transitions comprises using a hidden Markov model or a forward backward algorithm.

18. The one or more computer-readable storage memory devices recited in claim 15, wherein determining a highest probability language sequence comprises using a Viterbi Algorithm.

19. The one or more computer-readable storage memory devices recited in claim 15, comprising segmenting the multi-language text into a plurality of monolingual texts based on the highest probability language sequence.

20. The one or more computer-readable storage memory devices recited in claim 15, wherein learning the probability of language transitions comprises using a second order Markov model.

* * * * *